(12) United States Patent
Chauhan et al.

(10) Patent No.: US 11,171,942 B2
(45) Date of Patent: Nov. 9, 2021

(54) MULTI-DEVICE SINGLE SIGN-ON

(71) Applicant: VMware, Inc., Palo Alto, CA (US)

(72) Inventors: Jitender Singh Chauhan, Bengaluru (IN); Pinaki Sankar Kabiraj, Bengaluru (IN); Sameer Madhu Nadagouda, Bengaluru (IN); Mayank Joshi, Bengaluru (IN)

(73) Assignee: VMware, Inc., Palo Alto, CA (US)

( * ) Notice: Subject to any disclaimer, the term of this patent is extended or adjusted under 35 U.S.C. 154(b) by 192 days.

(21) Appl. No.: 16/665,760

(22) Filed: Oct. 28, 2019

(65) Prior Publication Data

US 2021/0126910 A1    Apr. 29, 2021

(51) Int. Cl.
*H04L 29/06* (2006.01)

(52) U.S. Cl.
CPC ...... *H04L 63/0815* (2013.01); *H04L 63/0428* (2013.01)

(58) Field of Classification Search
CPC ............ H04L 63/0815; H04L 63/0428
See application file for complete search history.

(56) References Cited

U.S. PATENT DOCUMENTS

| | | | | |
|---|---|---|---|---|
| 2006/0185004 A1* | 8/2006 | Song | ................... | H04L 63/0815 726/8 |
| 2011/0030044 A1* | 2/2011 | Kranendonk | ....... | H04L 63/0815 726/8 |
| 2012/0210413 A1* | 8/2012 | Akula | ................. | H04L 63/0815 726/8 |
| 2014/0189840 A1* | 7/2014 | Metke | ................. | H04L 63/0884 726/9 |
| 2016/0006745 A1* | 1/2016 | Furuichi | ............... | H04L 63/105 726/28 |
| 2016/0285858 A1* | 9/2016 | Li | ....................... | H04L 63/0815 |

* cited by examiner

*Primary Examiner* — Henry Tsang
(74) *Attorney, Agent, or Firm* — Thomas | Horstemeyer LLP (57) ABSTRACT

Disclosed are various approaches for extending a single sign-on (SSO) session to multiple devices. If a device is enrolled as a managed device with a management service, a SSO session can be extended to the device if the user has previously authenticated with an identity provider from another device. The user is authenticated on the second device using a user-and-device token issued by the management service with which the device is enrolled as a managed device.

20 Claims, 6 Drawing Sheets

MULTI-DEVICE SINGLE SIGN-ON

BACKGROUND

In an enterprise setting, individuals can utilize a number of different services and applications that are provided by an enterprise. These individuals can use authentication credentials to login to these application or services. For example, a user might have an email account or an account with a third party customer relationship management service. Accessing data within these services can be accomplished through a device with which the user is authenticated and which may have an authentication token associated with the user's identity.

However, a user is typically required to provide his authentication credentials from each device that the user typically uses to establish a single sign-on session from the devices. A user who uses many devices is therefore required to sign on from each of the devices before an identity provider provides an authentication token to each of the devices. In an environment where the user might have a laptop, multiple smartphones, and other devices, this can be a cumbersome process.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are examples of a system that facilitates authentication of a user and of a client device that is managed by a management service. More specifically, systems and methods that enable multi-device single sign-on (SSO) are disclosed. Application developers often support various standards for exchanging authentication data between entities, such as a service or server associated with the application, the device from which a service is accessed, and an identity provider that can authenticate a user. One example includes Security Assertion Markup Language (SAML), which is a specification that can support single sign-on of a user to a service, where access to the service is determined based on a user's identity within an identity provider.

Examples of this disclosure can facilitate single sign-on of a user by leveraging specifications and protocols like SAML that submit an authentication request to an identity provider service, which is also referred to herein as a SSO service. The identity provider can allow a user to authenticate his or her identity with the identity provider once, and the identity provider can provide an authentication token, such as a SAML identity assertion, that can be used by a third-party web service to verify the identity of the user. To authenticate his or her identity, the user must often provide authentication credentials, or SSO authentication credentials, that correspond to a user account that can be verified by the SSO service.

One authenticated with an the SSO service, the SSO service can provide a SSO token that an application on the client device can store and subsequently present to the SSO service to obtain authentication tokens that authenticate the client device to third party applications or services that the user may try to access. In other words, the SSO service can generate and provide authentication tokens to other applications and services on the user's device that can in turn be provided to other third party services to authenticate the user. However, if a user has multiple devices that are assigned to him or her by an enterprise, the user generally must authenticate his identity to the SSO service on each device. In other words, if the user has a laptop and a smartphone, the user is generally required to provide his or her authentication credentials, such as a username and password, to the SSO service from each device before the identity provider will issue an initial SSO token and subsequent authentication tokens without requiring the user to authenticate.

Examples of this disclosure allow a user to provide or authenticate his or her SSO authentication credentials on a single device. Subsequently, the user can be authenticated when requesting an authentication token from the SSO service on other devices without needing to reauthenticate with the SSO service. To facilitate this functionality, the multiple devices from which the user is considered authenticated with the SSO service should be managed by a management service. A management component or client executed on the client device can obtain a user-and-device token from a remotely executed management service, which can verify that the device from which the token was received is enrolled as a managed device and is assigned to a particular user account. Once verified, the management service can provide the user-and-device token to the requesting client application, which can in turn be provided to the SSO service. The SSO service can be instrumented to validate the user-and-device token as well as validate that the user has previously provided his authentication credentials to the SSO service from another device, which can be another managed device assigned to the user. Once validated, the SSO service can issue a SSO token to the requesting client application, thereby obviating the need for the user to provide his credentials to the SSO service from the second device.

Figure 1:
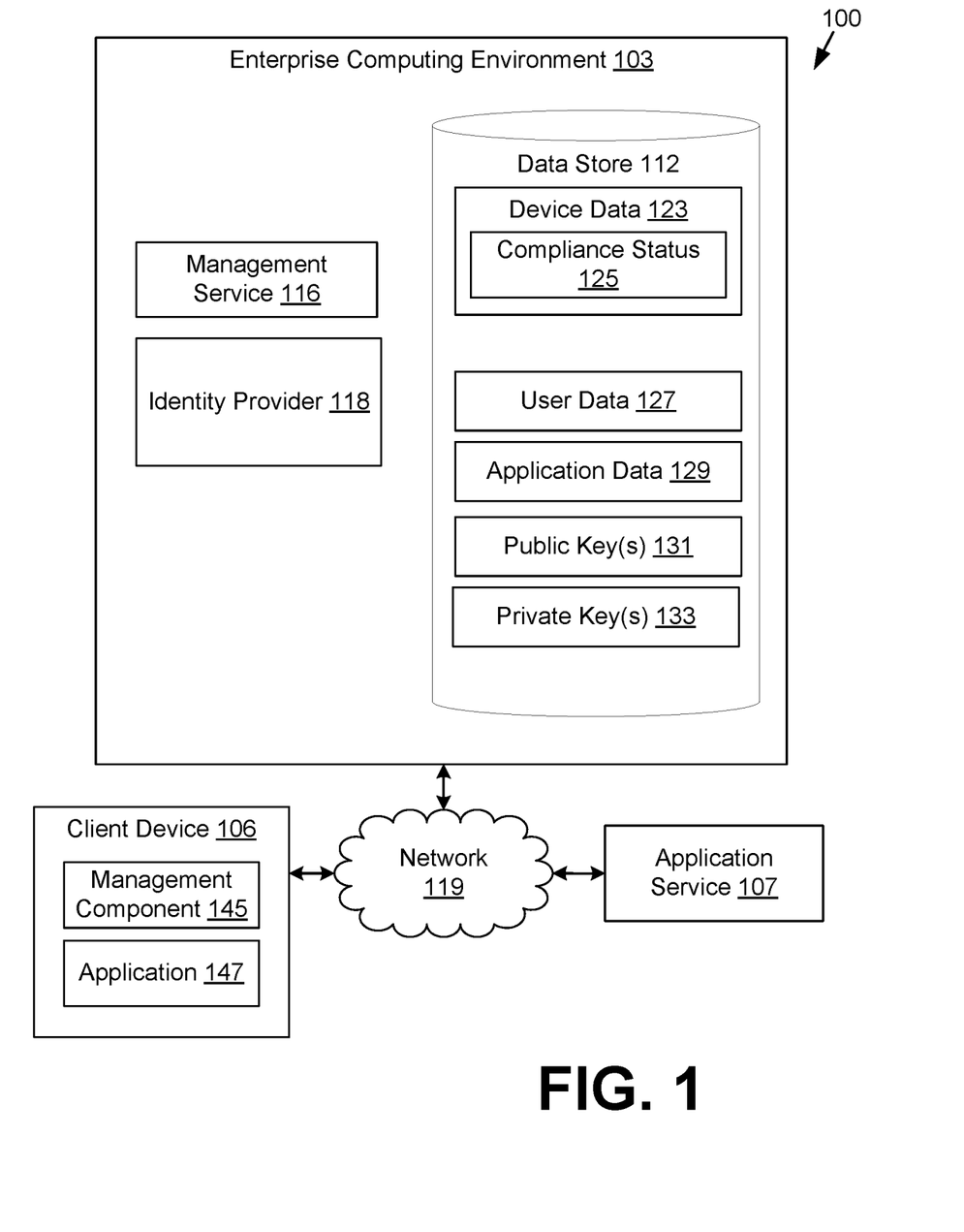
FIG. 1 is a block diagram depicting an example implementation according to various examples of the disclosure.

FIG. 1 illustrates an example of a networked environment 100 according to examples of the disclosure. In the depicted network environment 100, an enterprise computing environment 103 is in communication with at least one client device 106 and an application service 107 over a network 119.

The network 119 includes the Internet, intranets, extranets, wide area networks (WANs), local area networks (LANs), wired networks, wireless networks, other suitable networks, or any combination of two or more such networks. The networks can include satellite networks, cable networks, Ethernet networks, and other types of networks.

The enterprise computing environment 103 can be a computing environment that is operated by an enterprise, such as a business or other organization. The enterprise computing environment 103 includes a computing device, such as a server computer, that provides computing capabilities. Alternatively, the enterprise computing environment 103 can employ multiple computing devices that are arranged in one or more server banks or computer banks. In one example, the computing devices can be located in a single installation. In another example, the computing devices for the enterprise computing environment 103 can be distributed among multiple different geographical locations. In one case, the enterprise computing environment 103 includes multiple computing devices that together can form a hosted computing resource or a grid computing resource. Additionally, the enterprise computing environment 103 can operate as an elastic computing resource where the allotted capacity of computing-related resources, such as processing resources, network resources, and storage resources, can vary over time. In other examples, the enterprise computing environment 103 can include or be operated as one or more virtualized computer instances that can be executed to perform the functionality that is described herein.

Various applications or other functionality can be executed in the enterprise computing environment 103. Also, various data can be stored in a data store 112 that can be accessible to the enterprise computing environment 103. The data store 112 can be representative of a plurality of data stores 112. The data stored in the data store 112 can be associated with the operation of the various applications or functional entities described below.

The components executed on the enterprise computing environment 103 can include a management service 116, an identity provider 118, and other applications, services, processes, systems, engines, or functionality not discussed in detail herein. The management service 116 can be executed in the enterprise computing environment 103 to monitor and oversee the operation of one or more client devices 106 by administrators. In some examples, the management service 116 can represent one or more processes or applications executed by an enterprise mobility management (EMM) provider that facilitates administration of client devices 106 of an enterprise that are enrolled with the EMM provider. To this end, the operating system and application ecosystem associated with the client device 106 can provide various APIs and services that allow client devices 106 to be enrolled as managed devices with the management service 116.

The management service 116 can include a management console that can allow administrators to manage client devices 106 that are enrolled with the management service 116. User interfaces can allow an administrator to define policies for a user account or devices associated with an enterprise environment. The user interfaces can also include, for example, presentations of statistics or other information regarding the client devices 106 that can be managed by the management service 116.

The enterprise computing environment 103 can also execute an identity provider 118. The identity provider 118 can carry out federated user authentication on behalf of an enterprise. For example, the identity provider 118 can implement OAuth, SAML, or similar protocols that allow for federated user authorization or authentication. In examples of this disclosure, the identity provider 118 can also verify a user-and-device token provided by a client device 106 to provide multi-device SSO capabilities as described herein. The identity provider 118 can verify a user's credentials or identity and provide an authentication token, such as a SAML assertion, that can be provided to an application service 107 by an application on a client device 106 to authenticate the user's access to a service provided by the application service 107. The identity provider 118 can issue the authentication token to a client device 106 after verifying the identity of the user and/or client device 106 from which the user is attempting to access the application service 107. In the context of this disclosure, once a user has authenticated his identify from a first device, the identity provider 118 can authenticate the user from a second device that is managed by the management service 116 upon receiving a user-and-device token from the second device, where the user-and-device token can be verified by the identity provider 118.

The identity provider 118 can verify a user-and-device token issued by the management service 116 to a client device 106 that is enrolled as a managed device and that is associated with a particular user account. The user-and-device token can include information that allows the identity provider 118 to verify the user as well as the device. The user-and-device token can be signed so that the identity provider 118 can verify the authenticity of the token itself. If the user has already established his identity with the identity provider 118 from a first device, and the identity provider 118 subsequently receives a user-and-device token from a second device, the identity provider 118 can establish a SSO session with the second device if the user-and-device token can be validated. Validation can be performed by verifying the signature applied to the user-and-device token as well as the user and device identifying information contained within the token.

In some embodiments, the identity provider 118 can be implemented in a separate computing environment or by a separate entity than the management service 116. The management service 116 can provide an application programming interface (API) with which the identity provider 118 can communicate to verify a user-and-device token or to obtain a public key with which the signature of a user-and-device token can be verified. The management service 116 can also provide an API through which the identity provider 118 can verify user identifiers or device identifiers that are embedded within a user-and-device token.

The data stored in the data store 112 can include device data 123, user data 127, application data 129, and potentially other data. Device data 123 can include records to client devices 106 that are enrolled as managed devices with the management service 116. A record within device data 123 can include various security settings selected for enforcement on a client device 106 that is enrolled with the management service 116. Accordingly, a device record can include a device identifier associated with a device, such as the client device 106 and other data associated with managed devices. In some examples, device data 123 can also identify a user associated with or assigned to a particular client device 106. A device record can also store other device specific information, such as a device type, operating system type or version, applications that are required or optional for the device, or an enrollment status of the device. In this scenario, the device data 123 can also indicate whether a managed device is a computing device or a peripheral device, such as a printer, scanner, or other device that can be deployed in an environment and associated with a record in a directory service.

A public key 131 can correspond to a private key 133 or certificate that is used by the management service 116 to sign a user-and-device token that is generated by the management service 116 to facilitate multi-device SSO. The user-and-device token can be a JSON Web Token that is signed by the management service 116 and later verified by the identity provider 118 when the token is provided by a client device 106 to the identity provider 118. A public key 131 and private key 133 can be an asymmetric key pair that allows the management service 116 to sign a user-and-device token and subsequently for the identity provider 118 to verify the authenticity of a token provided by a client device 106. The management service 116 can maintain multiple key pairs that are used for different enterprises in a hosting environment or for different groups within a single enterprise.

A compliance status 125 of a client device 106 represents whether the device is in compliance with one or more compliance rules. Various compliance rules can be enforced by the management service 116 by the client device 106. Compliance rules can be based on time, geographical location, or device and network properties. For instance, the client device 106 can satisfy a compliance rule when the client device 106 is located within a particular geographic location. The client device 106 can satisfy a compliance rule in other examples when the client device 106 is in communication with a particular local area network, such as a particular local area network that is managed by the enterprise computing environment 103. Furthermore, a compliance rule in another example can be based upon the time and date matching specified values.

A compliance rule can specify that a client device 106 is required to be off or in a low power "sleep" state during a specified time period. Another compliance rule can specify that a client device 106 is required to be on or in a normal operation "awake" state during a specified time period. As another example, a compliance rule can specify that a client device 106 is prohibited from rendering content that has been designated as confidential.

Another example of a compliance rule involves whether a user belongs to a particular user group. For instance, a compliance rule can include a whitelist or a blacklist that specifies whether particular users or groups of users are authorized to perform various functionalities, such as installing or executing a particular application.

Other examples of compliance rules include a rule that specifies whether a client device 106 is compromised or "jailbroken." For example, a client device 106 can have hardware or software protections in place that prevent unauthorized modifications of the client device 106. If these protections are overridden or bypassed, the client device 106 can be considered out of compliance. As another example, a compliance rule can specify that the client device 106 is required to prompt a user for a password or personal identification number (PIN) in order to unlock the device.

A compliance rule can also require that the client device 106 have device encryption enabled, where data stored on the device is stored in an encrypted form. The data can be encrypted by a device certificate. A compliance rule can also specify that the client device 106 is enrolled with the management service 116 as a managed device. Another compliance rule can specify that the user is required to accept the terms of service that are presented by the management component 145 on the client device 106. As another example, a compliance rule can specify that the management component 145 is required to periodically communicate or "check-in" with the management service 116 to report on its status. If a threshold amount of time has elapsed since the previous check-in of the client device 106, the device can be considered to have violated this compliance rule.

Another compliance rule can specify that a client device 106 be running one of a specified variants or versions of a particular operating system. A compliance rule can also specify that an enrolled device be manufactured by a particular manufacturer or have a particular manufacturer identifier. Another compliance rule can specify that an enrolled device be a particular model name or model number. A client device 106 can also be considered out of compliance if the device is in a data roaming mode or has used a threshold amount of a periodic network data usage allowance.

Accordingly, the compliance status 125 indicates whether and to what extent a particular client device 106 is compliant with compliance rules assigned to the client device 106 by the management service 116. The compliance status 125 can be determined by a management component 145 on the client device 106 that analyzes the status of the client device 106 and reports compliance to the management service 116. In other examples, the compliance status 125 can be determined by the management service 116 based upon information about the status of the client device 106 that is reported by the management component 145. In examples of the disclosures, the compliance status 125 can also be determined by the identity provider 118 or management service 116 based upon an analysis of device identification parameters that are embedded within an authentication request originating from an application 147 or application service 107 associated with the application 147.

Accordingly, the management service 116 can enable multi-device SSO only for certain client devices 106 that are managed devices based on one or more compliance rules or other policies. For example, the management service 116 can allow only a subset of a user's managed devices to be eligible for extending SSO capability from a single device to multiple devices. As another example, the management service 116 and identity provider 118 can invalidate existing single sign-on sessions on any of the managed devices in the event that the compliance status 125 indicates that the device is out of compliance or when the device is reported to the management service 116 as lost or stolen.

As another example, the management service 116 and identity provider 118 can specify time-based applicability of the single sign-on session extension to multiple devices so that a session can be extended only during working hours (e.g. 9.00 AM to 5.00 PM) on some devices and during non-working hours on some other devices (e.g. 5.00 PM to 9.00 AM). Multi-device SSO can also be limited by policy to only certain users in a particular user group. As another scenario, the management service 116 and identity provider 118 can enable multi-device SSO to a particular client device 106 based on the device's location (e.g. prevent or disable session extension when the device is located in a prohibited locations or outside a certain permitted location). Any combination of policies can be supported and defined within the management service 116, which can operate in concert with the identity provider 118 to define the policy.

User data 127 contains information about user accounts in a user directory. The user accounts can be associated with client devices 106 that are enrolled with the management service 116. The user data 127 can be associated the same user accounts that are verified by the identity provider 118. In some implementations, the identity provider 118 can rely upon a separate set of user account data or a user directory to determine whether to issue an authentication token to an application on behalf of the user. In other implementations, the user data 127 is a user directory associated with the identity provider 118, and the management service 116 accesses the user data 127 through an API provided by the identity provider 118.

User data 127 can include profile information about a user, authentication information about a user, applications that are installed on client devices 106 associated with the user, and other user information. For example, user data 127 can include information about client devices 106 that are associated with a user account of the user, enterprise resources to which a particular user has access, such as email, calendar data, documents, media, applications, network sites, or other resources. The user data 127 can also identify one or more user groups of which a particular user is a member, which can in turn define the access rights of the user to one or more enterprise resources as well as identify which applications should be deployed to a client device 106 associated with the user. To this end, the user data 127 can further identify one or more device identifiers that can uniquely identify client devices 106 that are associated with a user account of the user.

Application data 129 represents data about applications that can be deployed through the management service 116 to client devices 106 that are enrolled as managed devices. Application data 129 can include application binaries or packages, a reference to a publicly accessible repository from which an application 147 can be obtained, and licensing or authentication data for an application 147. Application data 129 can also store configuration data for each client device 106 on which a copy of an application 147 is installed. The configuration data can include an application identifier corresponding to a unique installation of an application 147 on a particular client device 106 of a user.

The client device 106 can represent multiple client devices 106 coupled to the network 119. The client device 106 includes, for example, a processor-based computer system. According to various examples, a client device 106 can be in the form of a desktop computer, a laptop computer, a personal digital assistant, a mobile phone, a smartphone, or a tablet computer system. The client device 106 can represent a device that is owned or issued by the enterprise to a user, or a device that is owned by the user. The client device 106, when provisioned, can be enrolled with the management service 116 as a managed device of the enterprise.

The client device 106 can execute a management component 145 that can communicate with the management service 116 to facilitate management of the client device 106. The management component 145 can communicate with the management service 116 to enforce management policies and compliance rules on the client device 106. For example, the management component 145 can enforce data security requirements, install, remove or update security certificates, or write, modify or delete certain data from the client device 106. The management component 145 can also monitor network activity of the client device 106, the location of the client device 106, enforce password or personal identification number (PIN) requirements, or any other security or acceptable-use policies that are defined in the management service 116 and sent to the management component 145 over the network 119.

To carry out local management of a client device 106, the management component 145 can be installed and executed with elevated or administrative privileges on the client device 106. In some scenarios, the operating system can allow a particular application or package to be identified as a device owner or a device administrator.

One or more applications 147 can be installed on the client device 106. As a managed device that is enrolled with the management service 116, some applications 147 can be installed by the management service 116. In one scenario, the management service 116 can send a request to the management component 145 to retrieve and install a particular application 147 on the client device 106. In this sense, installation of the application is initiated by the management service 116. The management service 116 can also provide configuration data for a particular application 147 that it installed on the client device 106.

The application 147 can be a browser or incorporate browser functionality, such as a WebKit or WebView component, that allows the application 147 to access browser-based data provided by an application service 107 or the identity provider 118. In some scenarios, the application 147 can be a special-purpose application that accesses data and services provided by the application service 107. In either scenario, the application 147 can be used by a user to access an application service 107 and also to extend a SSO session across multiple devices as described herein.

The application service 107 represents one or more servers associated with a service that the application 147 might access over the network 119. For example, a particular application 147 deployed onto the client device 106 might require access to an Internet or cloud-based service. In some examples, the application service 107 can require user authentication. In some instances, the application service 107 can support federated authentication protocols in which authentication of a user's identity is performed by the identity provider 118. Examples of the disclosure can facilitate single sign-on of a user, where the user can authenticate his or her credentials to the identity provider 118 and access the application service 107 through the application 147 in scenarios where the application service 107 supports federated authentication and also supports user authentication using the identity provider 118.

In one example, the application 147 running on a client device 106 that is potentially enrolled with the management service 116 can request content from the application service 107. In this example, the client device 106 is a managed device that is enrolled with the management service 116 and assigned to a particular user account. Accordingly, to gain local access the client device 106 the user will have already provided some form of authentication, such as a biometric identifier or a passcode. In a SSO scenario, such as a SAML workflow, the application service 107 can redirect the application 147 to the identity provider 118. If the application 147 is not authenticated or requires re-authentication, the application service 107 can redirect the application 147 to the identity provider 118 with instructions to obtain an authentication credential or token, such as an authentication assertion, from the identity provider 118 and present the credential to the authentication service 107. In one scenario, the application service 107 can issue a redirect message to the application 147 with instructions to redirect to the identity provider 118.

Upon receiving the redirect instructions, the application 147 can generate an authentication request for transmission to the identity provider 118. The identity provider 118, in a typical SSO workflow, can then determine whether the application 147 on that client device 106 has been previously authenticated and issue an identity assertion if so, or challenge the user to authentication credentials if not. The identity provider 118 can make a determination by communicating with the management service 116 about whether the client device 106 is a managed device and whether multi-device SSO is supported for the user associated with the client device 106. Additionally, the identity provider 118 can confirm that the policies configured by the administrator permit multi-device SSO. Otherwise, the client-side code provide to the client device 106 will challenge the user to authenticate.

In examples of this disclosure, the identity provider 118 can determine whether the requesting application 147 is running on a client device 106 that is managed by the management service 116. If the requesting application 147 is running on a managed device, the identity provider 118 can respond to the authentication request with a browser page or another type of content container that contains a client-side script or executable code. For example, the client-side script can be Javascript embedded in a web page rendered in a browser or UI element in the application 147 that can render a web page. The client-side script can instruct the application 147 to make a request to the management component 145 running on the same client device 106.

The request comprises a request for a user-and-device token. The request to the management component 145 can identify the application 147 making the request by an application identifier, a user identifier, and/or a device identifier. The management component 145 can in turn request the user-and-device token from the management service 116 on behalf of the requesting application and provide the user-and-device token to the requesting application 147.

The user-and-device token generated by the management service 116 can identify the user account associated with the client device 106. The token can also identify the client device 106 on which the application 147 is running. The user-and-device token can include a user identifier and a device identifier that uniquely identify the user and device, respectively. In some examples, the user-and-device token can comprise a hash of a user identifier and device identifier that the identity provider 118 can verify using a reverse hash function or by communicating with the management service 116 to verify the hashed user identifier and device identifier.

Additionally, although described as a part of enterprise computing environment 103, the management service 116 and identity provider 118 can be third-party services relative to each other, on-premises services, cloud-based services, or services provided by a single entity.

Figure 2:
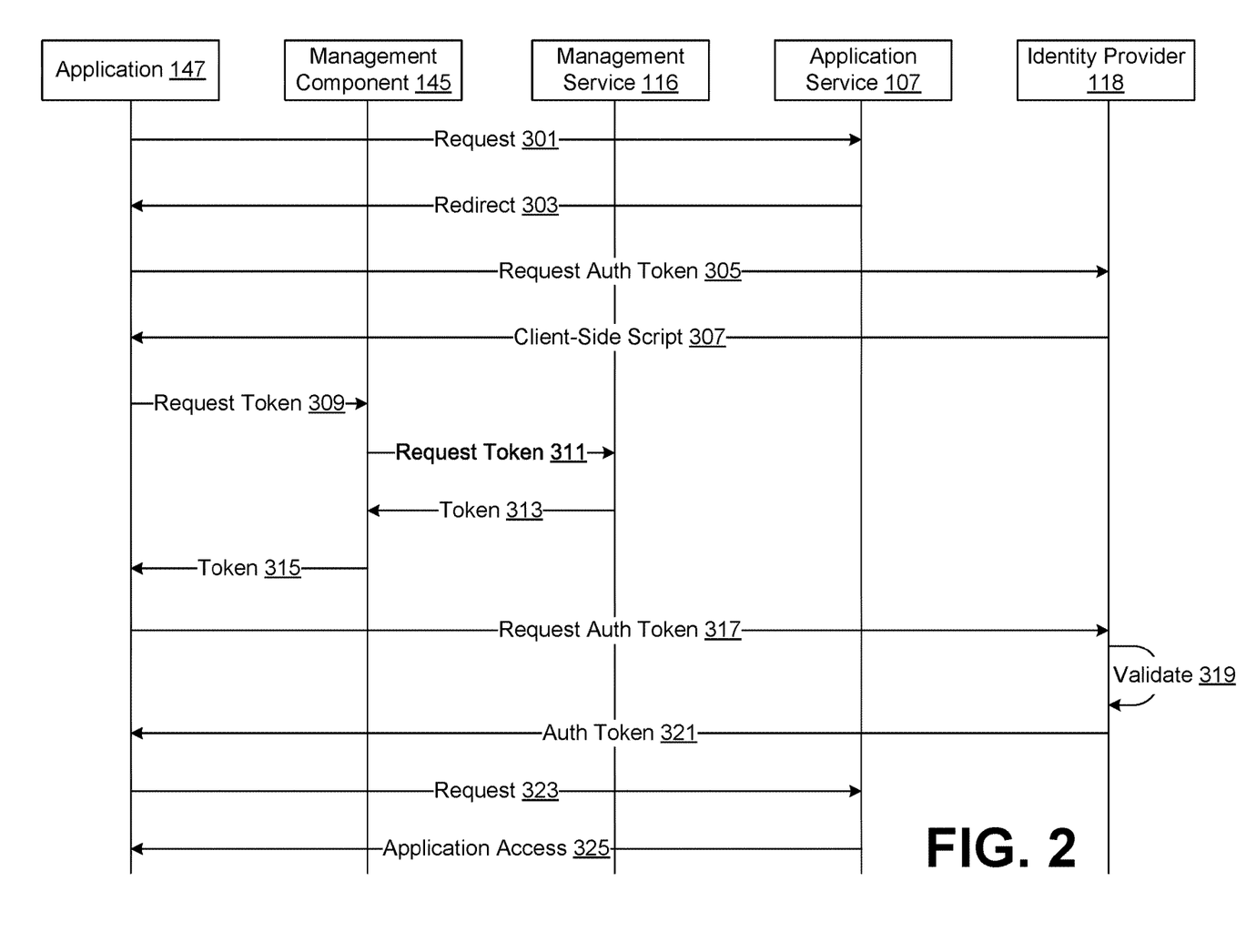
FIG. 2 is a sequence diagram that illustrates functionality according to an example of the disclosure.

Referring next to FIG. 2, shown is a sequence diagram that provides one example of how the management service 116 and identity provider 118 can provide a multi-device SSO experience for a user on a client device 106. In the sequence diagram of FIG. 2, it is assumed that the client device 106 has been enrolled as a managed device with the management service 116. First, at step 301, the application 147 can initiate a request to access a service or resource from the application service 107. For example, the application 147 can be a browser application that the user is using to access a web-based service provided by the application service 107, such as the user's email. In the scenario shown in FIG. 2, it is assumed that the application 147 does not yet have a session token issued by the application service 107 and that the application 147 is presently unauthenticated at step 301.

At step 303, the application service 107 can identity an identity provider 118 associated with the user making the request and redirect the application 147 to the appropriate identity provider 118. The redirect can be a SAML redirect, or a redirection consistent with a SSO protocol used by the identity provider 118 and application 147.

At step 305, upon receiving the redirect, the application 147 can submit a request for an authentication token for the application service 107 to the identity provider 118. An authentication token issued by the identity provider 118 can be utilized by the application service 107 to verify the identity of a user account of a user and the client device 106. The authentication token can be a SAML identity assertion or another token that the application service 107 can verify using a SSO protocol.

At step 307, the identity provider 118 can generate a content page that includes a client side script. The client side script can cause the application 147 to generate a request that is sent to the management component 145. The client-side script can be embedded in a web page that incorporates JavaScript code that instructs the application 147, such as a browser application, to make a request to a particular server address. The request comprises a request for a user-and-device token and can be directed to a particular port on the client device 106 to which the management component 145 has bound a server process. In other words, the request can be directed to a port on localhost. The request can include an application identifier that uniquely identifies the application 147.

At step 309, the application 147 makes the request for the user-and-device token from the management component 145. As noted above, the management component 145 can execute a server process that listens for requests from other applications on the client device 106. Upon receiving a request, the management component 145, in some examples, can validate the request by verifying an application identifier or other identifying information associated with the requesting application 147. In some cases, the request can be encrypted or secured so that the management component 145 can verify the authenticity of the request.

At step 311, if the management service 116 has verified the authenticity of the request from the application 147, the management component 145 can request a user-and-device token on behalf of the application 147 from the management service 116. The request for the user-and-device token can be made through a secure communication channel established between the management service 116 and management component 145. The request can identify the device and/or the user account associated with the device. The request can further identify the application service 107 to which the request from step 301 corresponds.

At step 313, the management service 116 can provide a user-and-device token to the management component 145 running on the client device 106 in response to the request from step 311. The management service 116 can verify the user account associated with the request from step 311 as well as the compliance status 125 of the client device 106 from which the request was sent in step 311. The user-and-device token can include one or more of a user identifier identifying a user account and a device identifier identifying the client device 106. The user-and-device token can also be signed by a private key associated with the management service 116. The user-and-device token can be generated such that it is short-lived or has an expiration period. In this way, if the token is stored and attempted to be used later, the token will be expired or unusable. The user-and-device token can be generated and signed as a JWT token, for example. Any other token generating or signing process can be used such that the identity provider 118 can later verify the token using a public key, certificate, or other mechanism. The user identifier and/or device identifier embedded within the user-and-device token can allow the identity provider 118 to verify the identity of a user account with or without consulting the management service 116.

At step 315, the management component 145 running on the client device 106 can provide the user-and-device token to the application 147. The user-and-device token can be provided to the client-side code running on the application 147 that was provided by the identity provider 118 and that requested the user-and-device token from the management component 145.

At step 317, the client-side code running on the application 147 can an authentication token to authenticate the application 147 to the application service 107 from the identity provider. The request can include the user-and-device token obtained from the management service 116 by way of the management component 145. The request can also include an identifier that identifies the particular application service 107 corresponding to the request made at step 301.

At step 319 the identity provider 118 can validate the user-and-device token. As noted above, the user-and-device token can be signed using a private key or certificate according to a protocol such as JWT. Accordingly, the identity provider 118 can obtain the public key corresponding to the private key from the management service 116 or from a storage area to which the identity provider 118 has access. Using the public key, the identity provider 118 can determine whether the user-and-device token was generated and/or signed by or on behalf of the management service 116. Assuming the signature was applied to the user-and-device token by or on behalf of the management service 116, the identity provider 118 can then determine whether the user account corresponding to the user identified by the user-and-device token is allowed access to the application service 107.

Additionally, the identity provider 118 can also validate whether the user account has been authenticated from another client device 106 managed by the management service 116. In other words, the identity provider 118 can determine whether the user created a SSO session from another managed device. If the user has not, then the identity provider 118 can challenge the application 147 for the user credentials of the user account. If the user has created a SSO session from another managed device, the identity provider 118 can assumed that by having local access to the managed device sending the request, the user is entitled to access. If validation of the user-and-device token is successful, the identity provider can generate an authentication token that the application 147 can provide to the application service 107 to authenticate the identity of a user account. The authentication token can be a SAML identity assertion or any other type of token according to a SSO protocol implemented by the application service 107.

At step 321, the identity provider 118 can send the authentication token to the application 147. The authentication token can be later used by the application 147 to authenticate the identity of a user account that the user wishes to access on the application service 107. At step 323, the application 147 can make an access request to the application service 107 and include the authentication token provided by the identity provider 118 to the application 147 at step 321. The application service 107 can provide application access at step 325, which might involve providing a session token or session cookie to the application 147, which the application 147 can store and utilize to conduct subsequent authenticated communications with the application service 107.

Figure 3:
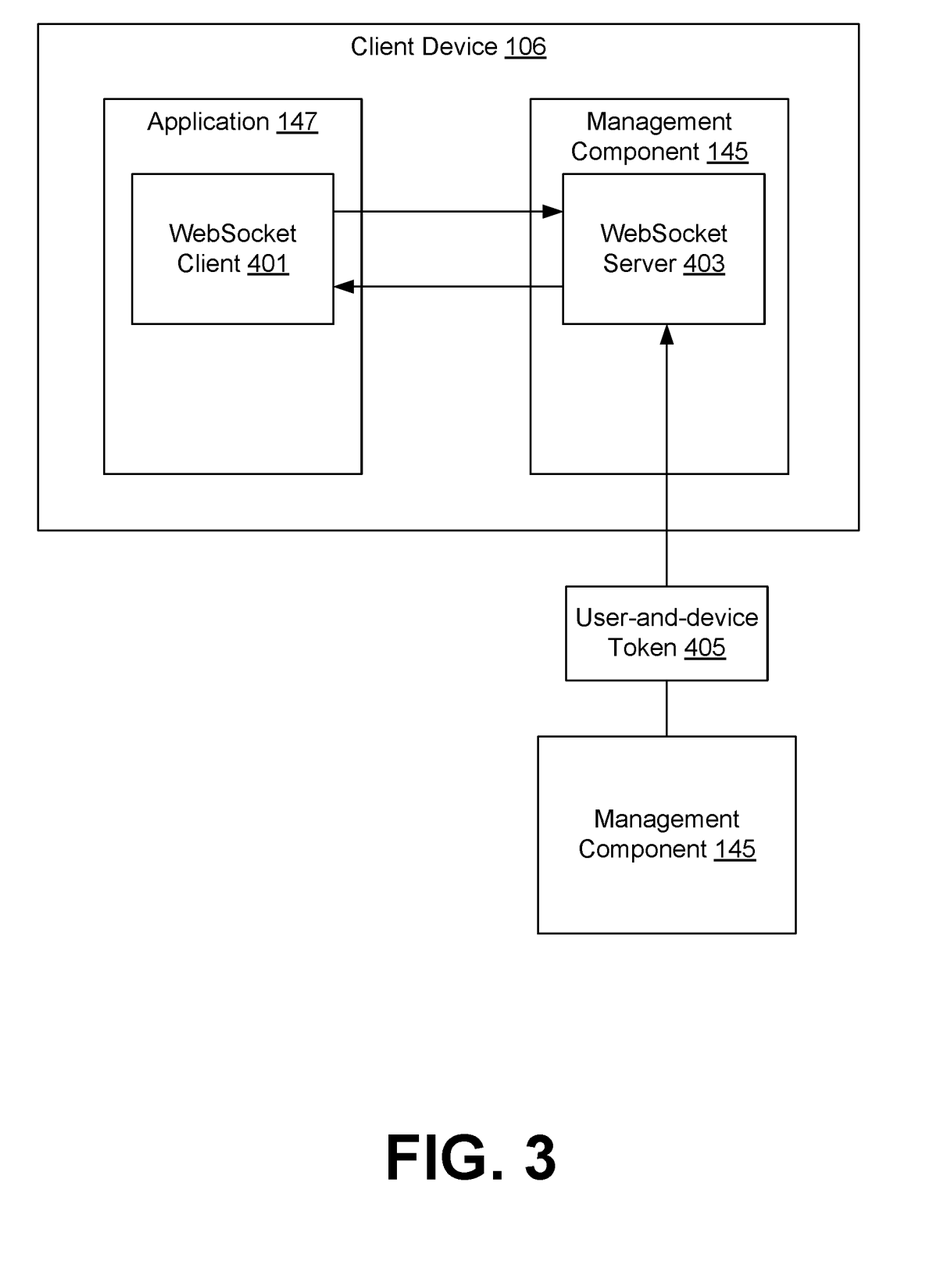
FIG. 3 is a block diagram depicting an example implementation according to various examples of the disclosure.

Referring next to FIG. 3, shown is a diagram that illustrates how the user-and-device token 405 can be obtained by the application 147. The application 147 requesting a user-and-device token 405 can execute a websocket client 401. The websocket client 401 can exist in client-side code provided in a content page or web page by the identity provider 118 to the application 147. The client side code can include instructions that facilitate establishing a TCP session with the management component 145, requesting a user-and-device token, and then providing the user-and-device token to the identity provider 118. Additionally, the websocket client 401 can be instrumented or hardcoded into an application 147.

The websocket client 401 can establish a session with a websocket server 403. The websocket server 403 can be a server process executed by the management component 145. The server process can listen for requests from websocket clients 401 on a particular port on localhost so that only requests from applications 147 running on the same client device 106 can request a user-and-device token 405 from the management component 145. Upon receiving the request from a websocket client 401, the websocket server 403 can cause the management component 145 to request a user-and-device token 405 from the management service 116. The management service 116 can verify the application 147 on the client device 106 before requesting user-and-device token 405 from the management service 116. The request to the management service 116 can include an application identifier as well as an identifier that identities the application service 107 to which the application 147 is requesting access.

The management component 145 can send a request to the management service 116 for a user-and-device token 405 on behalf of the application 147. The request can identify the application 147, the application service 107 associated with the request, and/or the client device 106 on which the management component 145 is running. The request can also identify a user account associated with the request. The management service 116 can validate the request by verifying the compliance status 125 of the client device 106 and whether the user account is entitled to access the requested application service 107. The management service 116 can be configured to deny a user-and-device token if the compliance status 125 indicates the client device 106 is out of compliance or the user data indicates that the user account is not entitled to access the requested application service 107.

If the management service 116 validates the compliance status 125, the identity of the client device 106 and/or an identity of the user, the management service 116 can issue a user-and-device token 405. The user-and-device token 405 can include device identifier and a user identifier. The user-and-device token 405 can also include an expiry indication that specifies when the user-and-device token 405 expires. In some implementations, the user-and-device token 405 can be validated by the management service 116 when presented to the management service 116 by the identity provider 118. In this way, the user-and-device token 405 can be short-lived and required to be used by the application 147 before expiration.

Figure 4:
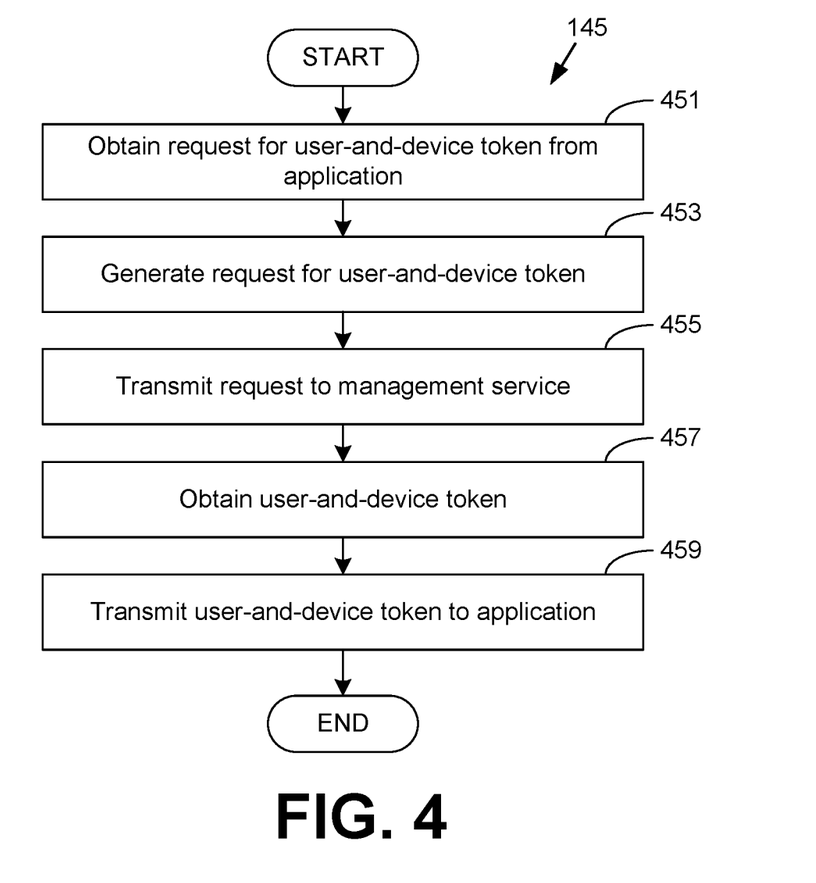
FIG. 4 is a flowchart that illustrates functionality according to a second example of the disclosure.

Referring next to FIG. 4, shown is a flowchart that provides one example of how the management component 145 can obtain a user-and-device token 405 on behalf of an application 147 executing on a client device 106. First, at step 451, the management component 145 can obtain a request for a user-and-device token 405 from an application 147 running on the same client device 106 as the management component 145. The request can identify the application 147 and/or the application service 107 to which the application is requesting access. As noted above, the application 147 can run client-side code that implements a websocket client 401, which can initiate the request to the management component 145 for the user-and-device token 405. The client-side code can reside in a content page provided by the identity provider 118 to the application 147, such as JavaScript code.

At step 453, the management component 145 can generate a request for a user-and-device token 405. The management component 145 can generate the request for the user-and-device token 405 after validating the request from the application 147. The management component 145 can validate the request based upon an application identifier or a user identifier contained within the request. In some implementations, the request can be encrypted with a key to which the management component 145 has access or can verify.

At step 455, the management component 145 can transmit the request for the user-and-device token 405 to the management service 116. The request can identify the application 147, the application service 107 associated with the request, and/or the client device 106 on which the management component 145 is running. The request can also identify a user account associated with the request. The management service 116 can validate the request by verifying the compliance status 125 of the client device 106 and whether the user account is entitled to access the requested application service 107. The management service 116 can be configured to deny a user-and-device token if the compliance status 125 indicates the client device 106 is out of compliance or the user data indicates that the user account is not entitled to access the requested application service 107.

At step 457, the management component 145 can obtain the user-and-device token 405 from the management service 116. The user-and-device token 405 can identify a user account and a device associated with the request. The identity provider 118, using such a token, can determine whether to authenticate a user without requiring the credentials of a user account.

At step 459, the management component 145 can transmit the can obtain the user-and-device token 405 from the management service 116. The user-and-device token 405 can identify a user account and a device associated with the request. The identity provider 118, using such a token, can determine whether to authenticate a user without requiring the credentials of a user account.

Figure 5:
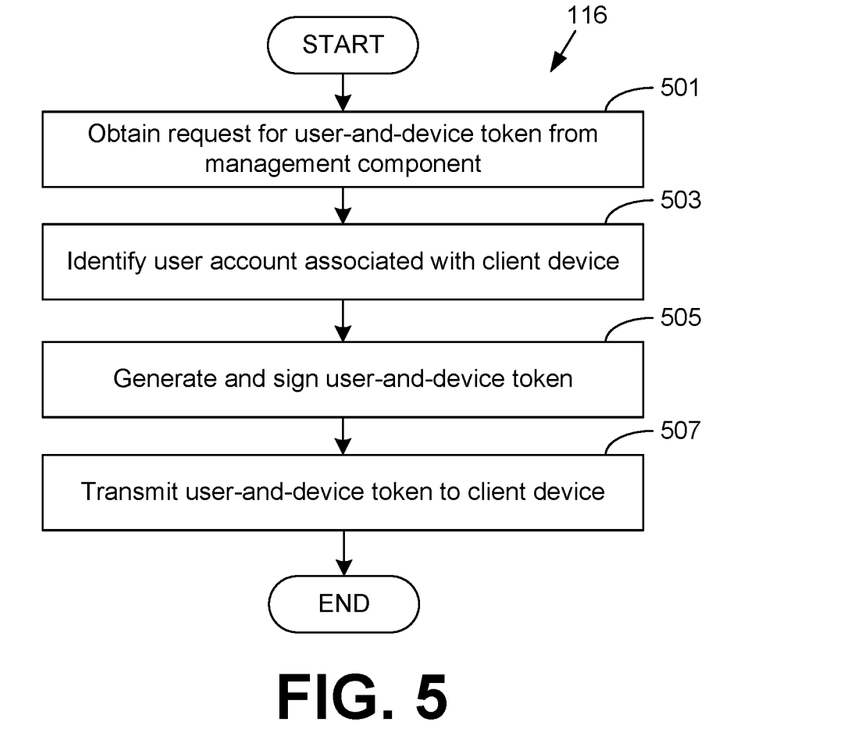
FIG. 5 is a flowchart that illustrates functionality according to a third example of the disclosure.

Referring next to FIG. 5, shown is a flowchart that provides one example of how the management service 116 can provide a user-and-device token 405 to a requesting application 147. First, at step 501, the management service 116 can obtain a request for a user-and-device token 405 from the management component 145 running on a client device 106 that is enrolled as a managed device with the management service 116. The request can identify the application 147, the application service 107 associated with the request, and/or the client device 106 on which the management component 145 is running. The request can also identify a user account associated with the request. The management service 116 can validate the request by verifying the compliance status 125 of the client device 106 and whether the user account is entitled to access the requested application service 107. The management service 116 can be configured to deny a user-and-device token if the compliance status 125 indicates the client device 106 is out of compliance or the user data indicates that the user account is not entitled to access the requested application service 107.

At step 503, the management service 116 can identify a user account associated with the request. In some implementations, the management service 116 can determine whether a user account is entitled to access a particular application service 107 before issuing a user-and-device token 405 to the management component 145. The user-and-device token 405 can identify a user account and a device associated with the request. The user-and-device token 405 can be a JWT token that expires after a specified amount of time.

At step 505, the management service 116 can generate and sign the user-and-device token 405. The user-and-device token 405 can include a user identifier and device identifier The management service 116 can utilize a private key 131 corresponding to a public key 131 accessible to the identity provider 118 to sign a user-and-device token that is generated by the management service 116 to facilitate multi-device SSO. The user-and-device token can be a JSON Web Token that is signed by the management service 116 and later verified by the identity provider 118 when the token is provided by a client device 106 to the identity provider 118. The public key 131 and private key 133 can be an asymmetric key pair that allows the management service 116 to sign a user-and-device token and subsequently for the identity provider 118 to verify the authenticity of a token provided by a client device 106.

At step 507, the management service 116 can provide the user-and-device token 405 to the management component 145. As noted above, the management component 145 can provide the user-and-device token 405 to a requesting application 147, which can in turn provide the user-and-device token 405 to the identity provider 118. Thereafter, the process proceeds to completion.

Figure 6:
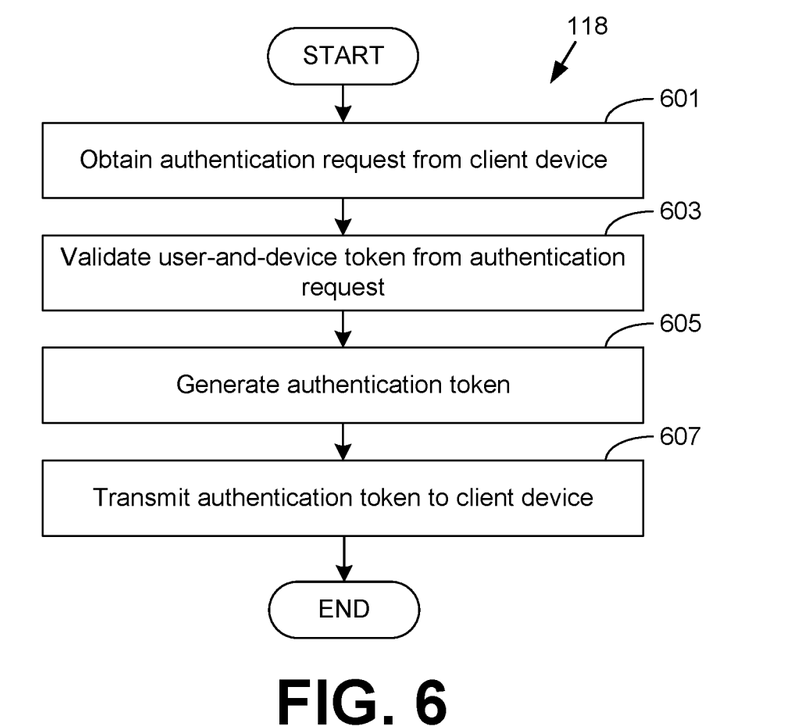
FIG. 6 is a flowchart that illustrates functionality according to a fourth example of the disclosure.

Referring next to FIG. 6, shown is a flowchart that provides one example of how the identity provider 118 can provide a multi-device SSO capability to a user. As noted above, the identity provider 118 can determine to authenticate a user without requiring the user to provide his authentication credentials from a device, even if the user has never authenticated with the identity provider 118 from the device. The identity provider 118 can make this determination if the user's client device 106 provides a user-and-device token 405 and if the user has previously authenticated with the identity provider 118 from another device. In one example, the identity provider 118 can limit extending a SSO session to a second device without requiring authentication from that device unless the first device the user has previously authenticated from is also a device that is managed by the management service 116.

First, at step 601, the identity provider 118 can obtain an authentication request from a client device 106. An authentication request can correspond to a request for an authentication token, such as a SAML identity assertion. The request can include a user-and-device token 405 that the client device 106 obtained from the management service 116.

At step 603, the identity provider 118 can validate the user-and-device token 405 received in the authentication request. There can be multiple layers of validation before the identity provider 118 considers the token to be validated. The identity provider 118 can determine whether the user has previously authenticated with his credentials from another client device 106. In other words, the identity provider 118 can determine whether the user has a current SSO session already established with the identity provider 118. If the user has authenticated previously, the identity provider 118 can also determine whether client device 106 from which the user authenticated is also a managed device managed by the management service 116. If the user has not previously authenticated with the identity provider 118 or if the user authenticated from an unmanaged device, the identity provider 118 can challenge the user to provide his authentication credentials via the application 147.

The identity provider 118 can also validate the user-and-device token 405 itself. The user-and-device token 405 can be generated such that it is short-lived or has an expiration period. In this way, if the token is stored and attempted to be used later, the token will be expired or unusable. Therefore, the identity provider 118 can check whether the user-and-device token 405 is unexpired. If the token is expired, the identity provider 118 can challenge the user to provide his authentication credentials via the application 147.

The identity provider 118 can also validate the authenticity of the user-and-device token 405. The user-and-device token 405 can be generated and signed as a JWT token, for example. Any other token generating or signing process can be used such that the identity provider 118 can verify the token using a public key, certificate, or other mechanism. Accordingly, the identity provider 118 can utilize the public key obtained from the management service 116 to verify the token and that the management service 116 issued the user-and-device token 405. The identity provider 118 can also verify the user identifier and/or device identifier embedded within the user-and-device token 405 with or without consulting the management service 116.

At step 605, the identity provider 118 can generate an authentication token for the client device 106 or the requesting application 147 on the client device assuming user-and-device token 405 was validated at step 603 and that the identity provider 118 has determined to extend the user's SSO session to a subsequent device. The authentication token can correspond to a SAML identity assertion.

At step 607, the identity provider 118 can transmit the authentication token to the client device 106. The application 147 can subsequently make an access request to the application service 107 and include the authentication token provided by the identity provider 118 to the application 147. The application service 107 can provide application access, which might involve providing a session token or session cookie to the application 147, which the application 147 can store and utilize to conduct subsequent authenticated communications with the application service 107. Thereafter, the process proceeds to completion.

The flowcharts of FIGS. 2-6 show an example of the functionality and operation herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 2-6 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The client device 106, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management service 116, identity provider 118, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

Therefore, the following is claimed:

1. A system for multi-device single sign-on (SSO) comprising:
   at least one computing device;
   a management service executed by the at least one computing device, wherein the management service causes the at least one computing device to at least:
      complete enrollment of a client device as a managed device with the management service, the management service configured to communicate with a management component installed on the client device;
      in response to a request to access a service that is redirected to an identity provider service, receive a request for a user-and-device token from the management component, the request identifying a user account;

generate the user-and-device token in response to the request; and transmit the user-and-device token to the management component, wherein the management component provides the user-and-device token to an application on the client device, the application obtaining an authentication token for the service from the identity provider using the user-and-device token.

2. The system of claim 1, wherein the request for the user-and-device token is embedded in a client-side script executed by a browser on the client device.

3. The system of claim 2, wherein the client-side script makes a request to a localhost port associated with the management component on the client device to obtain the user-and-device token.

4. The system of claim 1, wherein the management service signs the user-and-device token using a private key corresponding to the management service.

5. The system of claim 4, wherein the identity provider service validates the user-and-device token using a public key corresponding to the private key before issuing the authentication token to the application.

6. The system of claim 1, wherein the identity provider issues the authentication token in response to the user account being associated with a SSO session from another device.

7. The system of claim 1, wherein the identity provider requests credentials associated with the user account from the application in response to the user account not being associated with a SSO session from another device.

8. A non-transitory computer-readable medium comprising machine-readable instructions, wherein the instructions, when executed by at least one processor, cause a computing device to at least:

complete enrollment of a client device as a managed device with a management service, the management service configured to communicate with a management component installed on the client device;

in response to a request to access a service that is redirected to an identity provider service, receive a request for a user-and-device token from the management component, the request identifying a user account;

generate the user-and-device token in response to the request; and transmit the user-and-device token to the management component, wherein the management component provides the user-and-device token to an application on the client device, the application obtaining an authentication token for the service from the identity provider using the user-and-device token.

9. The non-transitory computer-readable medium of claim 8, wherein the request for the user-and-device token is embedded in a client-side script executed by a browser on the client device.

10. The non-transitory computer-readable medium of claim 9, wherein the client-side script makes a request to a localhost port associated with the management component on the client device to obtain the user-and-device token.

11. The non-transitory computer-readable medium of claim 8, wherein the management service signs the user-and-device token using a private key corresponding to the management service.

12. The non-transitory computer-readable medium of claim 11, wherein the identity provider service validates the user-and-device token using a public key corresponding to the private key before issuing the authentication token to the application.

13. The non-transitory computer-readable medium of claim 8, wherein the identity provider issues the authentication token in response to the user account being associated with a SSO session from another device.

14. The non-transitory computer-readable medium of claim 8, wherein the identity provider requests credentials associated with the user account from the application in response to the user account not being associated with a SSO session from another device.

15. A method comprising:

completing enrollment of a client device as a managed device with a management service, the management service configured to communicate with a management component installed on the client device;

in response to a request to access a service that is redirected to an identity provider service, receive a request for a user-and-device token from the management component, the request identifying a user account;

generate the user-and-device token in response to the request; and transmit the user-and-device token to the management component, wherein the management component provides the user-and-device token to an application on the client device, the application obtaining an authentication token for the service from the identity provider using the user-and-device token.

16. The method of claim 15, wherein the request for the user-and-device token is embedded in a client-side script executed by a browser on the client device.

17. The method of claim 16, wherein the client-side script makes a request to a localhost port associated with the management component on the client device to obtain the user-and-device token.

18. The method of claim 15, further comprising signing the user-and-device token using a private key corresponding to the management service.

19. The method of claim 18, wherein the identity provider service validates the user-and-device token using a public key corresponding to the private key before issuing the authentication token to the application.

20. The method of claim 15, wherein the identity provider requests credentials associated with the user account from the application in response to the user account not being associated with a SSO session from another device.

* * * * *